US010330390B2

(12) United States Patent
Agrawal (10) Patent No.: US 10,330,390 B2
(45) Date of Patent: Jun. 25, 2019

(54) FLUID HANDLING DEVICE AND A METHOD OF HEATING OR COOLING A FLUID FLOW

(71) Applicant: Verdus Technologies Pte. Ltd., Singapore (SG)

(72) Inventor: Avichal Agrawal, Singapore (SG)

(73) Assignee: Verdus Technologies PTE. LTD., Singapore (SG)

(*) Notice: Subject to any disclaimer, the term of this patent is extended or adjusted under 35 U.S.C. 154(b) by 71 days.

(21) Appl. No.: 15/108,262

(22) PCT Filed: Dec. 26, 2013

(86) PCT No.: PCT/SG2013/000552
§ 371 (c)(1),
(2) Date: Jun. 24, 2016

(87) PCT Pub. No.: WO2015/099604
PCT Pub. Date: Jul. 2, 2015

(65) Prior Publication Data
US 2016/0320137 A1    Nov. 3, 2016

(51) Int. Cl.
*F28D 7/00* (2006.01)
*F24H 1/00* (2006.01)
(Continued)

(52) U.S. Cl.
CPC .......... *F28D 7/0066* (2013.01); *F24F 5/0035* (2013.01); *F24H 1/00* (2013.01);
(Continued)

(58) Field of Classification Search
CPC ........ F28D 9/02; F28D 9/0006; F28D 9/0093; F28F 3/08; F24F 5/0035
See application file for complete search history.

(56) References Cited

U.S. PATENT DOCUMENTS 9,664,457 B2 * 5/2017 Takada .................... F28F 21/06
9,958,212 B2 * 5/2018 Lv ......................... F28D 9/0037
(Continued)

FOREIGN PATENT DOCUMENTS

WO        0122011 A1    3/2001
WO     2008118701 A2   10/2008

OTHER PUBLICATIONS

International Search Report and Written Opinion dated Mar. 11, 2014, in PCT/SG2013/000552 (9 pages).
(Continued)

*Primary Examiner* — Jon T. Schermerhorn, Jr.
(74) *Attorney, Agent, or Firm* — Patent Law Works LLP (57) ABSTRACT

A fluid handling device that is adapted to heat or cool a first fluid flow, the device includes a thermal chamber adapted to heat or cool the first fluid flow in the thermal chamber; and an input channel which is adapted to channel the first fluid flow into the thermal chamber, an outlet channel which is adapted to channel a heated or cooled second fluid flow out of the thermal chamber, such that the thermal energy of the second fluid flow along the outlet channel is higher or lower than the thermal energy of the first fluid flow along the input channel. The outlet channel is thermally connected to the input channel, so that the outlet channel is adapted to transfer thermal energy between the heated or cooled second fluid flow along the outlet channel and the first fluid flow along the input channel to heat or cool the first fluid flow before entering the thermal chamber.

12 Claims, 10 Drawing Sheets

(51) Int. Cl.
  *F28D 15/02*  (2006.01)
  *F28D 9/00*   (2006.01)
  *F28D 19/00*  (2006.01)
  *F25B 19/00*  (2006.01)
  *F24F 5/00*   (2006.01)
  *F28F 13/00*  (2006.01)
(52) U.S. Cl.
  CPC ............ *F25B 19/00* (2013.01); *F28D 9/0093* (2013.01); *F28D 15/0233* (2013.01); *F28D 15/0266* (2013.01); *F28D 19/00* (2013.01); *F28F 2013/006* (2013.01)

(56) References Cited

U.S. PATENT DOCUMENTS

| | | | |
|---|---|---|---|
| 2005/0037243 A1* | 2/2005 | Dubel | H01M 8/04089 429/413 |
| 2008/0254327 A1* | 10/2008 | Miyazaki | B01J 8/0415 429/416 |
| 2011/0042470 A1 | 2/2011 | Deivasigamani et al. | |
| 2011/0259572 A1* | 10/2011 | Muratani | B29C 45/0055 165/185 |
| 2012/0138280 A1* | 6/2012 | Angermann | F28D 9/0037 165/166 |
| 2013/0312671 A1 | 11/2013 | Deivasigamani et al. | |
| 2015/0027674 A1* | 1/2015 | Angermann | F28D 9/0037 165/166 |
| 2017/0276383 A1* | 9/2017 | Gilbert | F28F 3/08 |

OTHER PUBLICATIONS

International Preliminary Report on Patentability dated Jun. 28, 2016, in PCT/SG2013/000552 (6 pages).

* cited by examiner

FLUID HANDLING DEVICE AND A METHOD OF HEATING OR COOLING A FLUID FLOW

CROSS REFERENCE TO RELATED APPLICATIONS

This application is a National Stage of International Application No. PCT/SG2013/000552 filed Dec. 26, 2013, entitled "A Fluid Handling Device and a Method of Heating or Cooling a Fluid Flow", which is hereby incorporated by reference in its entirety.

TECHNICAL FIELD

The present invention relates to a fluid handling device and a method of heating and cooling a fluid flow.

BACKGROUND

Handling, e.g. heating or cooling, of a fluid, e.g. air or liquid, has been used commonly to heat or cool an environment. For example, heating of air to warm up a room in cold weather, cooling of liquid to cool down a machine.

Conventional method of heating and cooling a fluid is usually via a heat exchanger. Briefly, a fluid is passed through a heating or cooling element, whichever that is applicable, so that, in the case of heating, thermal energy is transferred from the heating element to the fluid to heat the fluid, in the case of cooling, thermal energy is transferred from the fluid to the cooling element. The heating or cooling element may be a fluid heating or cooling element whereby hot or cold fluid flows within the element.

Often, the fluid being pumped into the heat exchanger is taken from a source of ambient or room temperature, e.g. 30° C. Substantial amount of energy is required to heat up or cool down the fluid to a desired temperature, e.g. 100° C. or 20° C.

Further, fluid to heat or cool an environment, i.e. working fluid, is usually taken from the surrounding of the heating or cooling apparatus. As such, the working fluid is usually at ambient or room temperature and pressure. Similarly, to cool or heat the working fluid to a desirable temperature, substantial amount of energy is required to heat up or cool down the working fluid.

Clearly, the heating or cooling of a working fluid for the purpose of heating or cooling an environment may not be energy efficient. In today's context, where global warming is one of most concerning issue of mankind, a more energy efficient device and method of heating or cooling the working fluid would be in demand.

SUMMARY

According to various embodiments, a fluid handling device adapted to heat or cool a first fluid flow is provided. Fluid handling device includes a thermal chamber adapted to heat or cool the first fluid flow in the thermal chamber; and an input channel adapted to channel the first fluid flow into the thermal chamber, an outlet channel adapted to channel a heated or cooled second fluid flow out of the thermal chamber, such that the thermal energy of the second fluid flow along the outlet channel is higher or lower than the thermal energy of the first fluid flow along the input channel, such that the outlet channel is thermally connected to the input channel, such that the outlet channel is adapted to transfer thermal energy between the heated or cooled second fluid flow along the outlet channel and the first fluid flow along the input channel to heat or cool the first fluid flow before entering the thermal chamber.

According to various embodiments, the second fluid flow along the outlet channel may be isolated from the first fluid flow along input channel.

According to various embodiments, the second fluid flow exiting the thermal chamber via the outlet channel may be a portion of the first fluid flow along the thermal chamber.

According to various embodiments, the outlet channel may be thermally connected to the input channel via a fluid channel, such that the fluid channel may be in thermal communication with the outlet channel and in thermal communication with the input channel. The fluid channel may be adapted to receive a third fluid flow therein, such that thermal energy may be transferred between the third fluid flow along fluid channel and the second fluid flow along the outlet channel thereby heating or cooling the third fluid flow. As such, the thermal energy may be transferred between the first fluid flow along the input channel and the third fluid flow along the fluid channel thereby heating or cooling the first fluid flow along the input channel.

According to various embodiments, the third fluid flow along the fluid channel may be isolated from the first fluid flow along the input channel.

According to various embodiments, the second fluid flow along the outlet channel may be the same fluid flow as the first fluid flow along the input channel, such that the first fluid flow from the input channel may be channeled out of the thermal chamber via the outlet channel as the second fluid flow.

According to various embodiments, fluid handling device may further include an output channel adapted to allow the first fluid flow from the input channel to flow out of the thermal chamber via the output channel, an inlet channel adapted to allow the second fluid flow into the thermal chamber, the inlet channel in fluid communication with the outlet channel, such that the second fluid flow into the thermal chamber may be adapted to be channeled out of the thermal channel via the outlet channel.

According to various embodiments, the fluid channel may include an evaporative liquid.

According to various embodiments, the thermal chamber may include an evaporative liquid.

According to various embodiments, the input channel and/or the output channel may include an evaporative liquid.

According to various embodiments, the first fluid flow from the input channel to the output channel may be an airflow and the second fluid flow from the inlet channel to the outlet channel may be an evaporative liquid flow, such that the airflow through the thermal chamber vaporises the evaporative liquid flow thereby cooling the evaporative liquid flow hence cooling the thermal chamber.

According to various embodiments, the evaporative liquid flow may be adapted to flow through the thermal chamber from the inlet channel to the outlet channel in a fluid direction and the airflow flows from the input channel to the output channel in an airflow direction such that the fluid direction may be substantially perpendicular to the airflow direction.

According to various embodiments, the outlet channel may be fluidly connected to a fluid tank.

According to various embodiments, the fluid handling device may be a cooling device, such that the thermal chamber is a cooling chamber.

According to various embodiments, a method of heating or cooling a first fluid flow with a fluid handling device is provided. The method includes receiving a first fluid flow into a thermal chamber via an input channel; heating or cooling the first fluid flow through the thermal chamber; channeling the heated or cooled second fluid flow from the thermal chamber into an outlet channel, the outlet channel being in thermal communication with the input channel, wherein the second fluid flow along the outlet channel has a higher or lower thermal energy than the first fluid flow along the input channel; and transferring thermal energy between the second fluid flow along the outlet channel and the first fluid flow along the input channel thereby heating or cooling the first fluid flow along the input channel.

According to various embodiments, the method may further include receiving the second fluid flow into the thermal chamber via an inlet channel.

According to various embodiments, the method may further include channeling the first fluid flow out of the thermal chamber via an output channel.

According to various embodiments, transferring the thermal energy between the second fluid flow along the outlet channel and the first fluid flow along the input channel may include, receiving a third fluid flow in a fluid channel; transferring thermal energy between the third fluid flow along the fluid channel and the second fluid flow along the outlet channel; and transferring thermal energy between the first fluid flow along the input channel and the third fluid flow along the fluid channel thereby heating or cooling the first fluid flow along the input channel.

According to various embodiments, the first fluid flow may be an airflow.

According to various embodiments, the second fluid flow may be an evaporative liquid flow.

DETAILED DESCRIPTION

Figure 1:
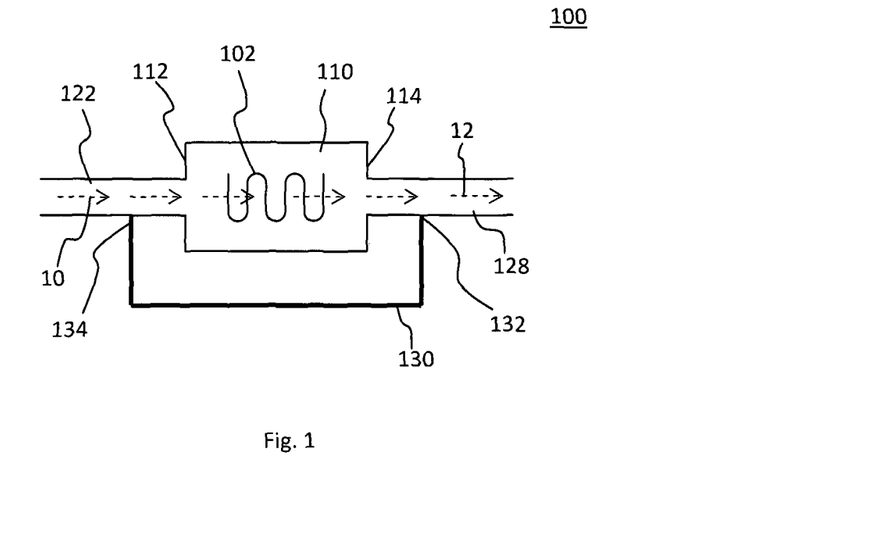
FIG. 1 shows a sectional view of an exemplary embodiment of a fluid handling device.

FIG. 1 shows an a fluid handling device 100. Fluid handling device 100 is adapted to heat or cool a first fluid flow 10. Fluid handling device 100 has a thermal chamber 110 adapted to heat or cool the first fluid flow 10 in the thermal chamber 110, an input channel 122 adapted to channel the first fluid flow 10 into the thermal chamber 110, an outlet channel 128 adapted to channel a heated or cooled second fluid flow 12 out of the thermal chamber 110 such that the thermal energy of the second fluid flow 12 along the outlet channel 128 is higher or lower than the thermal energy of the first fluid flow 10 along the input channel 122. Outlet channel 128 is thermally connected to the input channel 122 such that the outlet channel 128 is adapted to transfer thermal energy between the heated or cooled second fluid flow 12 along the outlet channel 128 and the first fluid flow 10 along the input channel 122 to heat or cool the first fluid flow 10 before entering the thermal chamber 110.

As shown in FIG. 1, fluid handling device 100 has a thermal chamber 110. Fluid handling device 100 has an input channel 122 for channeling the first fluid flow 10 into the thermal chamber 110. Input channel 122 may be at about a first end 112 of thermal chamber 110. Fluid handling device 100 has an outlet channel 122 for channeling a heated or cooled second fluid flow 12 out of the thermal chamber 110. Outlet channel 122 may be at about a second end 114 of the thermal chamber 110. Second end 114 may be along an edge of the thermal chamber 110 spaced from the first end 112. Second end 114 may be opposite the first end 112 across the thermal chamber 110.

Fluid handling device 100 may include a thermal conduit 130 adapted to transfer thermal energy between the input channel 122 and the outlet channel 128. Thermal conduit 130 may be in thermal communication with the input channel 122 and outlet channel 128. Thermal conduit 130 may include a receiving end 132 adapted to be in thermal communication with outlet channel 128 and a conducting portion 134 adapted to be in thermal communication with input channel 122. Thermal conduit 130 may be a thermal conductor adapted to conduct thermal energy between the input channel 122 and the outlet channel 128.

Thermal chamber 110 may include a thermal element 102. Thermal element 102 may be a heat exchanger to allow exchange of heat between the first fluid flow 10 and the thermal element 102. For heating purposes, thermal element 102 may be a heating element, e.g. heating coil. Thermal element 102 may be a fluid conduit connected to a heated fluid source and adapted to allow heated fluid through the fluid conduit. For cooling purposes, thermal element 102 may be a cooling element, e.g. a cooling coil. Thermal element 102 may be a fluid conduit connected to a fluid source with cooled liquid and may be adapted to allow cooled fluid through fluid conduit.

As first fluid, flow 10 enters the thermal chamber 110 via input channel 12, first fluid flow 10 may be heated or cooled by the thermal element 102 as required. After the first fluid flow 10 has been heated or cooled, first fluid flow 10 may exit thermal chamber 110 through outlet channel 128 as heated or cooled second fluid flow 12. As second fluid flow 12 flows through the outlet channel 128, thermal energy may be transferred between the thermal conduit 130 and the second fluid flow 12. As such, thermal conduit 130 may be heated or cooled to a temperature of second fluid flow 12, which is higher or lower than the temperature of the first fluid flow 10 accordingly, after the first fluid flow 10 has been heated or cooled by thermal element 102. As thermal conduit 130 may be thermally connected to the input channel 122, thermal energy may be transferred between the first fluid flow 10 and thermal conduit 130. As such, first fluid flow 10 may be heated or cooled by the thermal conduit 130 before entering the thermal chamber 110. From the above, it may be understood that the "heat" or "coldness" of the second fluid flow 12 is "transferred" to the first fluid flow 10.

Heated or cooled second fluid flow 12 may be used for heating or cooling purpose, e.g. cooling an engine, heating or cooling a room.

It is clear in FIG. 1 that second fluid flow 12 along outlet channel 128 may be isolated from the first fluid flow 10 along the input channel 122 such that fluid handling device 100 allow thermal energy transfer between input channel 122 and outlet channel 128 but not fluid transfer.

Thermal conduit 130 may be connected to a heat exchanger (not shown in FIG. 1) so that the cooled second fluid flow 12 can be used to cool a thermal body, e.g. air, water. Thermal conduit 130 may be in thermal communication with the thermal body and may be used to heat or cool the thermal body accordingly. The thermal body may be heated or cooled to the same temperature of second fluid flow 12. After the thermal exchange with the thermal body, second fluid flow 12 may be used to cool first fluid flow 10 as described above.

Figure 2:
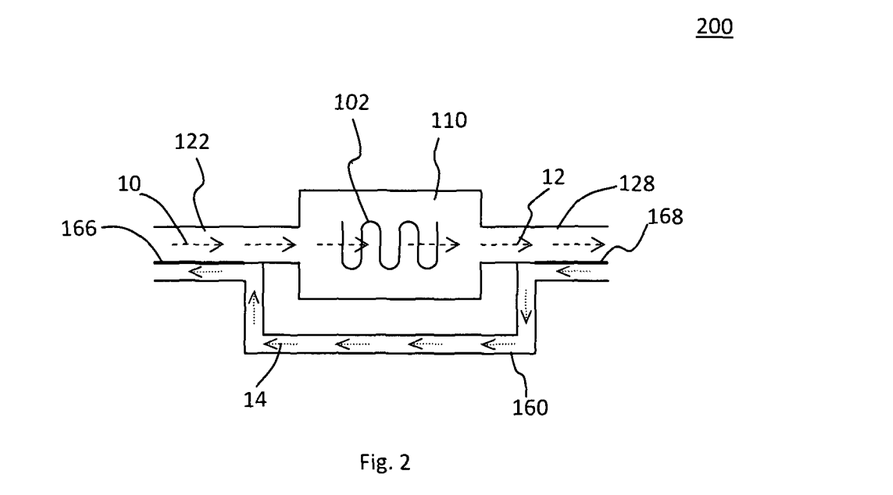
FIG. 2 shows a sectional view of an exemplary embodiment of the fluid handling device in FIG. 1.

FIG. 2 shows fluid handling device 200. Features of fluid handling device 200 in FIG. 2 that are identical to features of fluid handling device 200 in FIG. 1 have the same reference numeral. Thermal conduit 130 may be a fluid channel 160. As shown in FIG. 2, outlet channel 128 may be thermally connected to the input channel 122 via fluid channel 160, such that fluid channel 160 may be in thermal communication with the outlet channel 128 and in thermal communication with the input channel 122. Fluid channel 160 may be adapted to receive a third fluid flow 14 therein, such that thermal energy may be transferred between the third fluid flow 14 along fluid channel 160 and the second fluid flow 12 along the outlet channel 128 thereby heating or cooling the third fluid flow 14 and such that the thermal energy may be transferred between the first fluid flow 10 along the input channel 122 and the third fluid flow 16 along the fluid channel 160 thereby heating or cooling the first fluid flow 10 along the input channel 122.

Fluid channel 160 may be connected to a fluid source (not shown in FIG. 2). Fluid source may be of ambient temperature or a heated or cooled fluid source. Fluid channel 160 may have a first thermal interface portion 166 adapted to allow thermal energy transfer between input channel 122 and fluid channel 160. Fluid channel 160 may have a second thermal interface portion 168 adapted to allow thermal energy transfer between outlet channel 128 and fluid channel 160. First and second thermal interface portion 166,168 may be a conduit, a plate or any element capable of conducting thermal energy. As third fluid flow 14 travels along first thermal interface portion 166 within fluid channel 160, thermal energy may be transferred between input channel 122 and fluid channel 160. If third fluid flow 14 has a lower thermal energy level than that of first fluid flow 10, thermal energy may be transferred from first fluid flow 10 to third fluid flow 14 and vice versa. Similarly, as third fluid flow 14 travels along second thermal interface portion 168 within fluid channel 160, thermal energy may be transferred between outlet channel 128 and fluid channel 160. If third fluid flow 14 has a lower thermal energy level than that of second fluid flow 12, thermal energy is transferred from second fluid flow 12 to third fluid flow 14 and vice versa.

Figure 3:
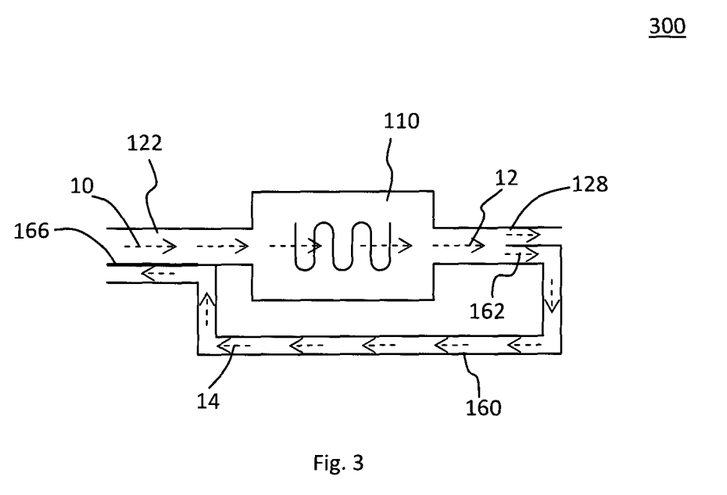
FIG. 3 shows a sectional view of an exemplary embodiment of the fluid handling device in FIG. 1.

As shown in FIG. 3, fluid channel 160 may include an inlet end 162 that is fluidly connected to the outlet channel 128 such that fluid channel 160 may be in fluid communication with the outlet channel 128 via the inlet end 162. Fluid channel 160 may extend from outlet channel 128 to or towards input channel 122. Fluid channel 160 may be in thermal communication with the input channel 122 at first thermal interface portion 166 such that thermal energy may be transferred between the third fluid flow 14 along fluid channel 160 and the first fluid flow 10 along input channel 122.

Second fluid flow 12 exiting the thermal chamber 110 via the outlet channel 128 may be a portion of the first fluid flow 10 along the thermal chamber 110. First fluid flow 10 may be directed out of thermal chamber 110 into the outlet channel 128 as second fluid flow 12. Fluid channel 160 may receive second fluid flow 12 or a portion of second fluid flow 12 along outlet channel 128 such that the second fluid flow 12 into the fluid channel 160 becomes third fluid flow 14, i.e. second fluid flow 12 or a portion thereof may be directed into the fluid channel 130 as third fluid flow 14. Remaining portion of second fluid flow 12 may be directed out of fluid handling device 300 for heating or cooling purposes.

As shown in FIG. 1, FIG. 2 and FIG. 3, second fluid flow 12 along the outlet channel 128 may be isolated from the first fluid flow 10 along input channel 122. Second fluid flow 12 through the outlet channel 128 does not flow into the input channel 122 or flow "back" into input channel 122. As shown in FIG. 2 and FIG. 3, third fluid flow 14 along the fluid channel 130 may be isolated from the first fluid flow 10 along the input channel 122. Third fluid flow 14 may be isolated from the first fluid flow 10 such that fluid handling device 200,300 allows thermal energy transfer between input channel 122 and outlet channel 128 but not fluid transfer: Second fluid flow 12 or a portion thereof may flow out of the thermal chamber 110 through the outlet channel 128 and may not flow back into the thermal chamber 110 or into the input channel 122.

Second fluid flow 12 may be directed back into the input channel 122 or thermal chamber 110 (as third fluid flow 14) to allow mixture of the heated or cooled second fluid flow 12 (or third fluid flow 14) with the first fluid flow 10 to heat up or cool down the first fluid flow 10 before entering or in the thermal chamber 110.

Figure 4:
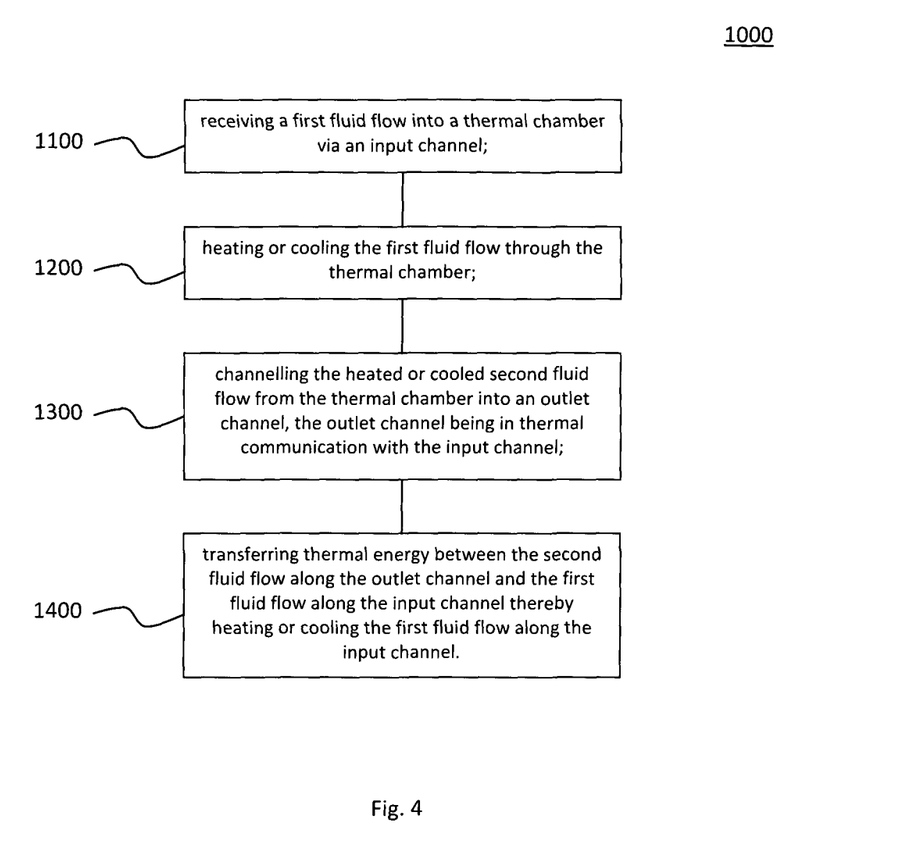
FIG. 4 shows a flowchart of a method of heating or cooling a first fluid flow using the fluid handling device in FIG. 1.

FIG. 4 shows a diagram of a method 1000 of heating or cooling a first fluid flow with fluid handling device 100,200, 300. Method 1000 includes receiving a first fluid flow into a thermal chamber 110 via an input channel 122 as shown in step 1100; heating or cooling the first fluid flow 10 through the thermal chamber 110 in step 1200; channeling the second heated or cooled fluid flow 12 from the thermal chamber 110 into an outlet channel 128 in step 1300. Outlet channel 128 being in thermal communication with the input channel 122, such that the second fluid flow 12 along the outlet channel 128 has a higher or lower thermal energy than the first fluid flow 10 along the input channel 122; and transferring thermal energy between the second fluid flow 12 along the outlet channel 128 and the first fluid flow 10 along the input channel 122 thereby heating or cooling the first fluid flow 10 along the input channel 122 as shown step 1400.

Fluid handling device 100,200,300 may receive first fluid flow 10 by channeling first fluid flow 10 into thermal chamber 110 via input channel 122. As first fluid flow 10 enters and goes through thermal chamber 110, first fluid flow 10 may be heated or cooled by heating or cooling element 102 where appropriate. Heated or cooled first fluid flow 10 may exit thermal chamber 110 via outlet channel 128 as second fluid flow 12. Comparatively, second fluid flow 12 may have a higher or lower thermal energy than first fluid flow 10. As outlet channel 128 is in thermal communication with the input channel 122, thermal energy may be transferred between the outlet channel 128 and input channel 122. In this way, thermal energy may be transferred between second fluid flow 12 and first fluid flow 10, i.e. thermal energy may be transferred from heated second fluid flow 12 to first fluid flow 10 or thermal energy may be transferred from heated first fluid flow 10 to second fluid flow 12. Accordingly, first fluid flow 10 may be heated or cooled before entering thermal chamber 110.

Figure 5:
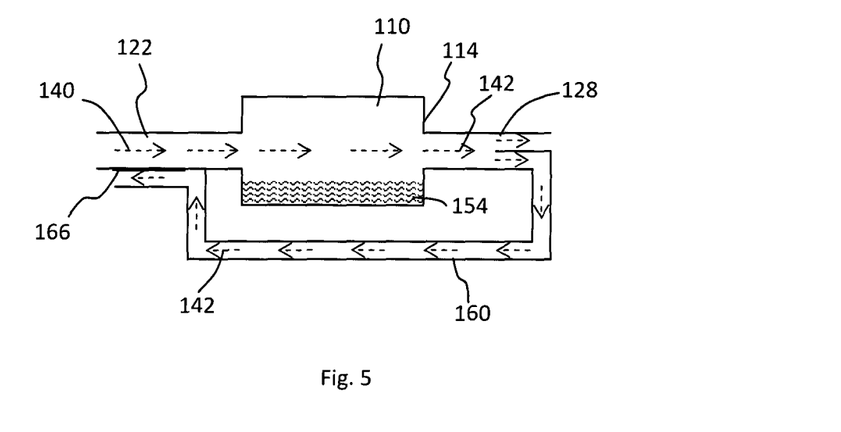
FIG. 5 shows a sectional view of an exemplary embodiment of the fluid handling device in FIG. 1.

FIG. 5 shows an exemplary embodiment of a fluid handling device 500 being configured as a cooling device. Fluid handling device 500 may be a cooling device such that thermal chamber 110 may be a cooling chamber. Thermal chamber 110 may include an evaporative liquid 154. First fluid flow 10 may be an airflow 140. Evaporative liquid 154 may vaporise into airflow 140 as airflow 140 passes over or through evaporative liquid 154. Thermal chamber 110 may be cooled as evaporative liquid 154 vaporises, i.e. by evaporative cooling. As airflow 140 passes through thermal chamber 110, airflow 140 may be cooled within thermal chamber 110. Airflow 140 becomes saturated, i.e. relative humidity of airflow 140 increase towards 100%, as airflow 140 goes through thermal chamber 110. Accordingly, the temperature of evaporative liquid 154 and consequently, the temperature of thermal chamber 110 may be lowered until saturation of airflow 140 reaches a maximum level. Second fluid flow 12 may be cooled airflow 142. As airflow 140 becomes saturated, evaporation of evaporative liquid 154 decreases or ceases. As evaporation decreases and ceases, cooling accordingly decreases or ceases. Therefore, cooled airflow 142 may have a lower thermal energy level than airflow 140. As shown in FIG. 5, a portion of cooled airflow. 142 may be directed into fluid channel 160 towards input channel 122. At the interface between input channel 122 and fluid channel 160, e.g. first thermal interface portion 166, thermal energy may be transferred from the airflow 140 to cooled airflow 142 thereby cooling airflow 140 prior to entering the thermal chamber 110. Evaporative liquid 154 may be replenished into thermal chamber 110 when the amount of evaporative liquid 154 is low.

Figure 6:
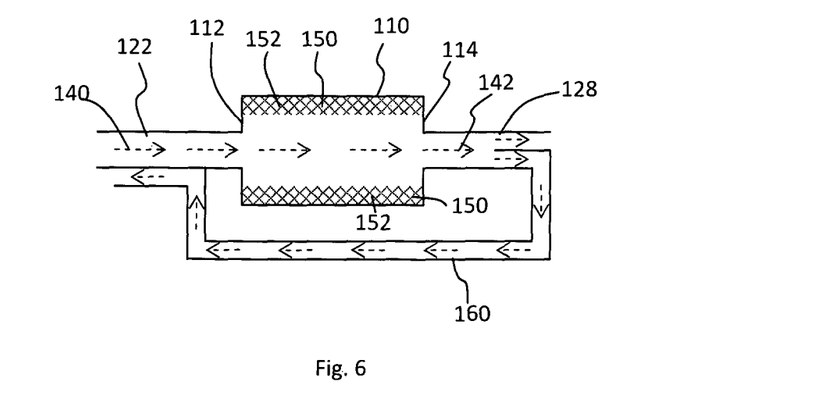
FIG. 6 shows a sectional view of an exemplary embodiment of the fluid handling device in FIG. 1.

As shown in FIG. 6, thermal chamber 110 may include a liquid retainer 150. Liquid retainer 150 may extend from first end 112 to second end 114 of thermal chamber 110. Liquid retainer 150 may be on at least one inner side of thermal chamber 110. Liquid retainer 150 may be on opposing inner sides of thermal chamber 110. Liquid retainer 150 may be adapted to retain an evaporative liquid 154, e.g. water, alcohol. Evaporative liquid 154 may be replenished into liquid retainer 150 in thermal chamber 110 as the level of evaporative liquid 154 is relatively low. Liquid retainer 150 may be a wicking element, sponge or equivalent.

First fluid flow 10 may be airflow 140. As airflow 140 enters thermal chamber 110 via input channel 122 and passes above or through liquid retainer 150, liquid 152 may vaporise into airflow 140 and thereby cooling the thermal chamber 110. Airflow 140 may be taken from ambient air and may have ambient humidity and temperature. Airflow 140 may have relatively humidity of less than 100% and may be able to absorb vapour from the evaporative liquid 152. Similar to earlier embodiments, fluid handling device 600 may include an input channel 122 adapted to channel airflow 140 into the thermal chamber 110 and an outlet channel 128 adapted to channel cooled airflow 142 out of thermal chamber 110 after airflow 140 is cooled in thermal chamber 110. Also, similar to earlier embodiments, cooled airflow 142 or a portion thereof may be channeled into fluid channel 160 and directed towards input channel 122 via fluid channel 160. Cooled airflow 142 may be adapted to cool airflow 140 as fluid channel 160 is in thermal communication with input channel 122 such that thermal energy from airflow 140 may be transferred to cooled airflow 142 along fluid channel 160. It is clear that if thermal chamber 110 is adapted to heat airflow 140, cooled airflow 142 may be heated airflow 142 and airflow 140 may be heated before entering thermal chamber 110.

Figure 7:
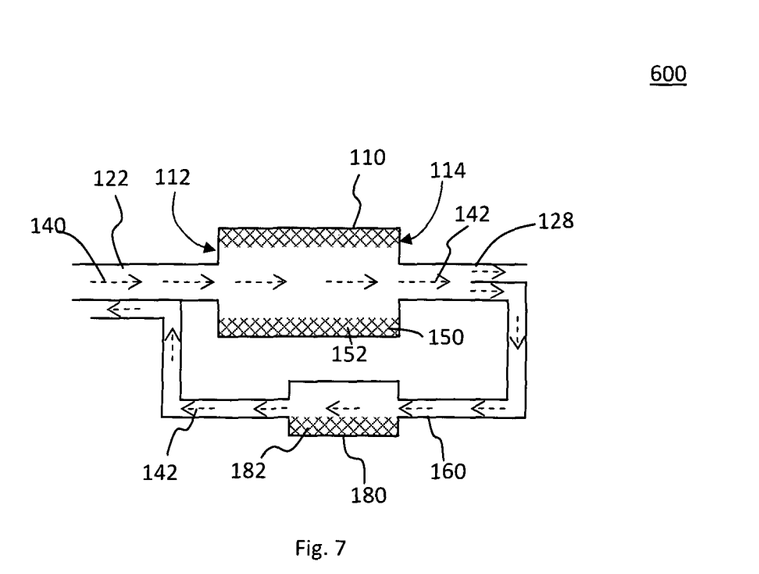
FIG. 7 shows a sectional view of an exemplary embodiment of the fluid handling device in FIG. 1.

As shown in FIG. 7, fluid channel 160 may include an evaporative liquid 182. Fluid channel 160 may include an evaporative compartment 180. Evaporative compartment 180 may be disposed along fluid channel 160 such that fluid communication is established between fluid channel and evaporative compartment 180. Evaporative compartment 180 allows the temperature of cooled airflow 142 to be maintained at wet bulb temperature. Evaporative compartment 180 allows vaporisation of evaporative liquid into airflow 142. Cooled airflow 142 along fluid channel 160 may flow through evaporative compartment 180 and evaporative liquid 182 may vaporise into cooled airflow 142 to allow cooling of evaporative compartment 180 via evaporative cooling. As mentioned, evaporative cooling would cease if cooled airflow 142 is saturated.

As cooled airflow 142 travels along fluid channel 160, the temperature of cooled airflow 142 may increase. The increase in cooled airflow 142 temperature may be due to higher ambient temperature. As the temperature of cooled airflow 142 increases, relative humidity of cooled airflow 142 decreases. If the relative humidity of cooled airflow 142 travelling through evaporative compartment 180 drops below 100%, evaporative liquid 182 in evaporative compartment 180 may vaporise into cooled airflow 142 to saturate cooled airflow 142. As vaporisation continues in the evaporative compartment 180, temperature within evaporative compartment 180 may drop to wet bulb temperature. Consequently, the temperature of cooled airflow 142 may be maintained at a minimum temperature or wet bulb temperature.

Figure 8:
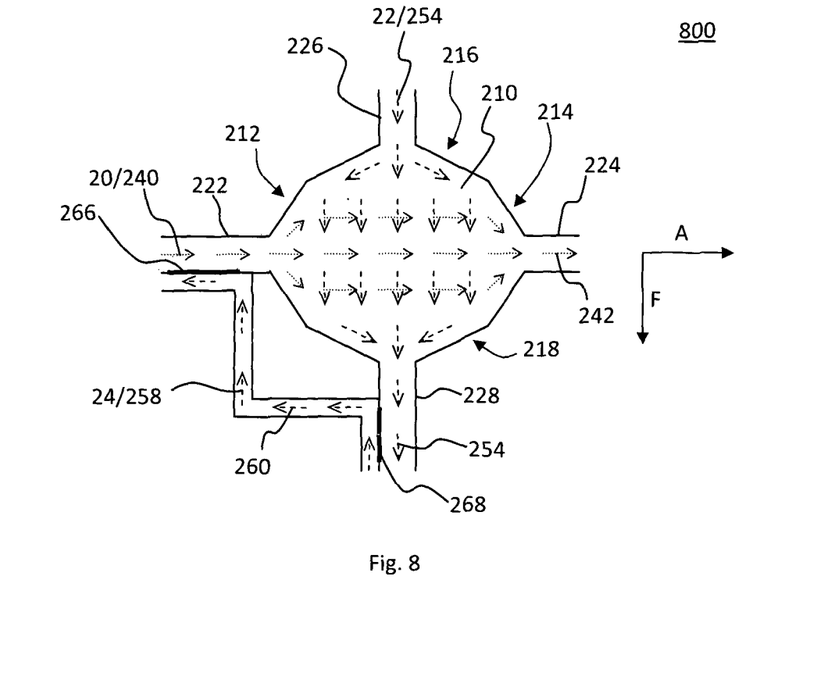
FIG. 8 shows a sectional view of an exemplary embodiment of a fluid handling device.

FIG. 8 shows a fluid handling device 800. Fluid handling device 800 may include a thermal chamber 210 adapted to cool a first fluid flow 20 in the thermal chamber 210, i.e. thermal chamber 210 may be a cooling chamber. Fluid handling device 800 may include an input channel 222 adapted to channel a first fluid flow 20 into the thermal chamber 210. Fluid handling device 800 may include an output channel 224 adapted to allow first fluid flow 10 from the input channel 222 to flow out of the thermal chamber 210 via the output channel 224. Input channel 222 may be at about a first side 212 of thermal chamber 210. Output channel 224 may be at about a second side 214 of thermal chamber 210. First side 212 may be opposite second side 214 such that input channel 222 may be substantially opposite output channel 224. Fluid handling device 800 may include an inlet channel 226 adapted to allow a second fluid flow 22 into the thermal chamber 210. Fluid handling device 800 may include an outlet channel 228 adapted to allow second fluid flow 22 out of the thermal chamber 210. Inlet channel 226 may be at about a top side 216 of thermal chamber 210 and outlet channel 228 may be at about a bottom side 218 of thermal chamber 210. Top side 216 may be substantially opposite bottom side 218 such that inlet channel 226 may be opposite outlet channel 228. Inlet channel 226 may be in fluid communication with outlet channel 224, such that second fluid flow 22 into thermal chamber 210 may be adapted to be channeled out of thermal chamber 210 via outlet channel 228.

First fluid flow 20 from the input channel 222 to the output channel 224 may be an airflow 240 and the second fluid flow 22 from the inlet channel 226 to the outlet channel 228 may be an evaporative liquid flow 254, wherein the airflow 240 through the thermal chamber 210 vaporises the evaporative liquid flow 254 thereby cooling the evaporative liquid flow 254 hence cooling the thermal chamber 210. First fluid flow 20 may be an airflow. As shown in FIG. 8, airflow 240 may flow into thermal chamber 210 via input channel 222 and directed across thermal chamber 210 towards output channel 224. Second fluid flow 22 may include an evaporative liquid flow 254. Evaporative liquid flow 254 may enter into thermal chamber 210 via inlet channel 226 and directed across thermal chamber 210 towards outlet channel 228. As airflow 240 flows across evaporative liquid flow 224, evaporative liquid flow 254 vaporises into airflow 240. As vaporisation takes place, evaporative cooling occurs and airflow 240 cools. Consequently, thermal chamber 210 cools to wet bulb temperature of the evaporative liquid. Rate of flow of evaporative liquid flow 254 may be controlled or moderated as required.

Figure 9:
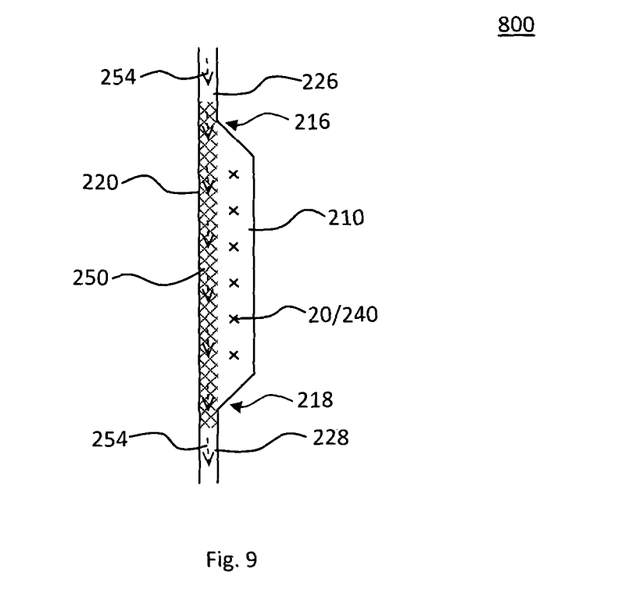
FIG. 9 shows a sectional view of the fluid handling device in FIG. 8.

Thermal chamber 210 may include a fluid retainer 250 (see FIG. 9) adapted to retain evaporative liquid flow 254. Fluid retainer 250 may extend from top side 216 to bottom side 218 of thermal chamber 210. Fluid retainer 250 may extend from first side 212 to second side 214 of thermal chamber 210. Fluid retainer 250 may be a layered element disposed along a back side 220 of thermal chamber 210 as shown in FIG. 9. Back side 220 may extend from first side 212 to second side 214 and from top side 216 to bottom side 218 of thermal chamber 210. Fluid retainer 250 may be a water retaining pad, sponge, wicking element, etc.

As shown in FIG. 9, evaporative liquid flow 254 enters thermal chamber 210 via inlet channel 226 and travels through fluid retainer 250 from top side 216 to bottom side 218. Evaporative liquid flow 254 may exit thermal chamber 210 via outlet channel 228. Airflow 240 entering thermal chamber 210 via input channel 222 may flow across fluid retainer 250 and absorb evaporative fluid vapour from evaporative liquid flow 254. In this way, fluid retainer 250 may be evaporative pads. Consequently, thermal chamber 210 may be cooled by the evaporative cooling of evaporative liquid 254. Evaporative fluid 254 exits thermal chamber 210 via outlet channel 228 as cooled evaporative fluid 254. As explained below, cooled evaporative fluid 254 which exited thermal chamber 210 may be used to cool airflow 240, directly or indirectly.

Referring to FIG. 8, evaporative liquid flow 254 may be adapted to flow through the thermal chamber 210 from the inlet channel 226 to the outlet channel 228 in a fluid direction F. Airflow 240 may flow from the input channel 222 to the output channel 224 in an airflow direction A. Fluid direction F may be substantially perpendicular to the airflow direction A. Fluid direction F may be in a vertical direction. Evaporative liquid flow 254 may travel in a top to bottom direction within thermal chamber 210. Airflow 240 may be in a horizontal direction. Airflow 240 may travel in a left to right direction or vice versa. Airflow direction A and fluid flow direction F may be horizontal directions and substantially perpendicular to each other.

As shown in FIG. 8, outlet channel 228 may be thermally connected to the input channel 222 via fluid channel 260, such that fluid channel 260 may be in thermal communication with outlet channel 228 and in thermal communication with the input channel 222. Fluid channel 260 may be adapted to receive a third fluid flow 24 therein, such that thermal energy is transferred between the third fluid flow 24 along fluid channel 260 and the second fluid flow 22 along the outlet channel 228 thereby cooling the third fluid flow 24 and such that the thermal energy may be transferred between the first fluid flow 20 along the input channel 222 and the third fluid flow 26 along the fluid channel 260 thereby cooling the first fluid flow 20 along the input channel 222.

Fluid channel 260 may be connected to a fluid source (not shown in FIG. 8). Fluid source may be of ambient temperature or a heated or cooled fluid source. Fluid channel 260 may have a first thermal interface portion 266 adapted to allow thermal energy transfer between input channel 222 and fluid channel 260. Fluid channel 260 may have a second thermal interface portion 268 adapted to allow thermal energy transfer between outlet channel 228 and fluid channel 260. As third fluid flow 24 travels along first thermal interface portion 266 within fluid channel 260, thermal energy may be transferred between inlet channel 222 and fluid channel 260. If third fluid flow 24 has a lower thermal energy level than that of first fluid flow 20, thermal energy is transferred from first fluid flow 20 to third fluid flow 24 and vice versa. Similarly, as third fluid flow 24 travels along second thermal interface portion 268 within fluid channel 260, thermal energy may be transferred between outlet channel 228 and fluid channel 260. If third fluid flow 24 has a lower thermal energy level than that of second fluid flow 22, thermal energy is transferred from second fluid flow 22 to third fluid flow 24 and vice versa.

Third liquid flow 24 may be a return evaporative liquid flow 258 as it is returned towards input channel 222. As return evaporative liquid flow 258 travels along fluid channel 260 at about second thermal interface portion 268, thermal energy of return evaporative liquid flow 258 may be transferred to evaporative liquid flow 254 along outlet channel 228 as evaporative liquid flow 254 is cooler than return evaporative liquid flow 258. As return evaporative liquid flow 258 flows along fluid channel 260 at about first thermal interface portion 266, thermal energy of airflow 240 may be transferred to return evaporative liquid flow 258 as return evaporative liquid flow 258 is cooler than the airflow 240. Accordingly, airflow 240 may be cooled to wet bulb temperature before entering thermal chamber 210.

It is clear in FIG. 8 that third fluid flow 24 along the fluid channel 230 may be isolated from the first fluid flow 20 along the input channel 222. Second fluid flow 22 may flow out of the thermal chamber 110 through the outlet channel 228 and may not flow back into the thermal chamber 210 or into the input channel 222. Second fluid flow 22 or a portion thereof may be directed into the fluid channel 230 as third fluid flow 24. Third fluid flow 24 may be isolated from the first fluid flow 20 such that third fluid flow 24 does not mix with first fluid flow 20. However, thermal energy transfer is possible between input channel 222 and outlet channel 228 via fluid channel 260. Thermal energy transfer may be conducted at a thermal interface 228. First thermal interface portion 266 may be adapted to transfer thermal energy from third fluid flow 24 to first fluid flow 20.

Figure 10:
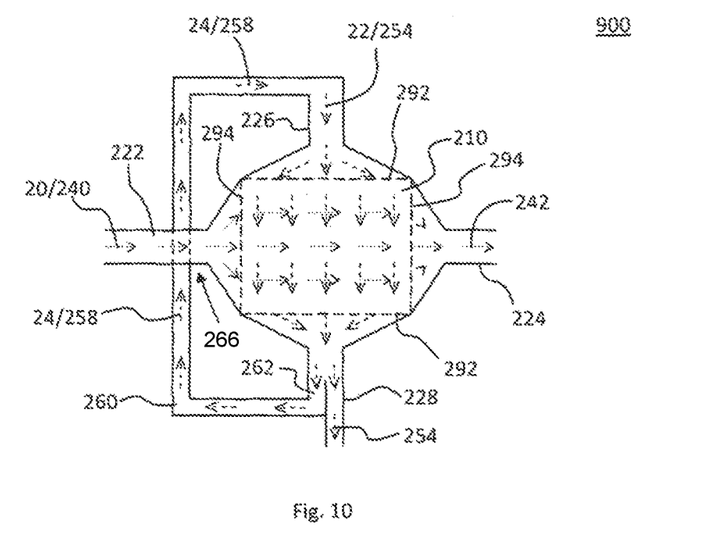
FIG. 10 shows a sectional view of an exemplary embodiment of the fluid handling device in FIG. 8.

Referring to FIG. 10, fluid channel 260 may include an inlet end 262 connected to the outlet channel 228 such that fluid channel 260 may be in fluid communication with the outlet channel 228 via the inlet end 262. Fluid channel 260 may extend from outlet channel 228 to or towards input channel 222. Fluid channel 260 may be in thermal communication with input channel 222. Fluid channel 260 may include first thermal interface portion 266 such that fluid channel 260 may be in thermal communication with the input channel 222 so that thermal energy may be transferred between the third fluid flow 24 along fluid channel 260 and first fluid flow 20 along input channel 222. Fluid channel 260 may extend across input channel 222 such that first fluid flow 20 may flow around fluid channel 260. As first fluid flow 20 flows around fluid channel 260, first fluid flow 20 may be cooled by the cooled third fluid flow 24, which has lower thermal energy level than first fluid flow 20, through fluid channel 260. Fluid channel 260 may be a plurality of fluid tubes (not shown in FIG. 10) such that first fluid flow 20 may flow between the plurality of fluid tubes.

Fluid channel 260 may be fluidly connected to input channel 222 so as to direct third fluid flow 24 back into thermal chamber 210 via input channel 222. Third fluid flow 24 may be cooled second fluid flow 22 when directed back into input channel 222. As third fluid flow 24 may be cooler than ambient temperature, though may be warmer than the temperature within thermal chamber 210, less energy is required to cool third fluid flow 24 that is entering thermal chamber 210. In terms of relative humidity, the relative humidity of third fluid flow 24 may decrease as it gets warmed up when flowing through fluid channel 260, especially when third fluid flow 24 goes through input channel 222. Even so, the relative humidity of third fluid flow 24 returning to thermal chamber 210 may be higher than relative humidity of ambient air. Therefore, it is faster for returning third fluid flow 24 to reach saturation.

As mentioned, first fluid flow 20 may be directed out of thermal chamber 210 into the outlet channel 228 as second fluid flow 22. Second fluid flow 22 exiting the thermal chamber 210 via the outlet channel 228 may be a portion of the first fluid flow 20 along the thermal chamber 210. Fluid channel 160 may receive second fluid flow 22 or a portion of second fluid flow 22 along outlet channel 228 such that the fluid which flows into the fluid channel 260 becomes third fluid flow 14.

As shown in FIG. 10, thermal chamber 210 may include first partitions 292 across inlet channel 226 and outlet channel 228, first partitions 292 being adapted to prevent first fluid flow 20 through the first partitions 292 but allow second fluid flow 22 through first partitions 292. Thermal chamber 210 may include second partitions 294 across input channel 222 and output channel 224, second partitions 294 may be adapted to prevent second fluid flow 22 but allow first fluid flow 20 through said second partitions 294.

Figure 11:
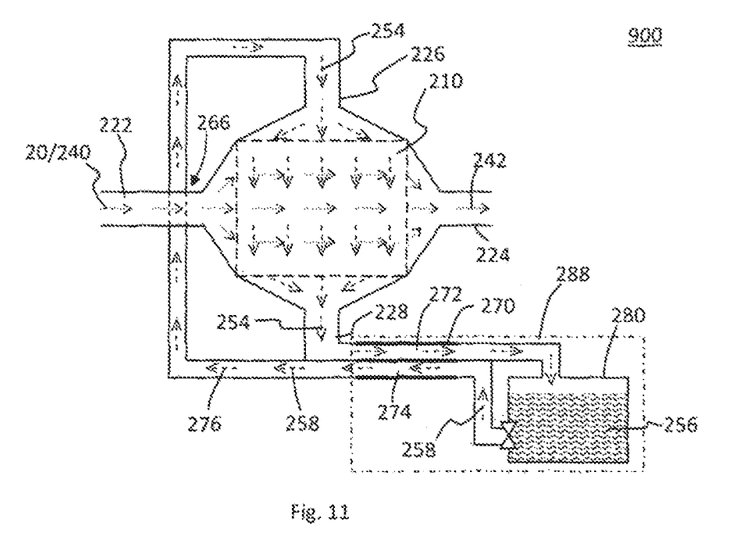
FIG. 11 shows a sectional view of an exemplary embodiment of the fluid handling device in FIG. 8.

Fluid handling device 900 may include a heat exchanger 270 as shown in FIG. 11. Heat exchanger 270 may be in fluid communication thermal chamber 210. Heat exchanger 270 may include a first channel 272 and a second channel 274 in thermal communication with first channel 272. First channel 272 may be fluidly connected to thermal chamber 210 such that evaporative liquid flow 254 from thermal chamber 210 may flow into first channel 272. Evaporative liquid flow 254 may flow out of thermal chamber 210 via outlet channel 228 and into first channel 272. Heat exchanger 270 may be fluidly connected to a fluid tank 280. Fluid tank 280 may be adapted to contain evaporative liquid 256. First channel 272 may be in fluid communication with fluid tank 280 such that evaporative liquid flow 254 exiting first channel 272 may be channeled into fluid tank 280. Second channel 274 may be fluidly connected to fluid tank 280 such that evaporative liquid 256 stored in fluid tank 280 may be pumped into second channel 274 as return evaporative liquid flow 258.

Second channel 274 may be thermally connected to input channel 222 such that thermal energy of airflow 240 may be transferred to return evaporative liquid flow 258 thereby cooling airflow 240 before entering thermal chamber 210.

Fluid handling device 900 may include a cooling channel 276 fluidly connected to second channel 274 of heat exchanger 270 and thermally connected to input channel 222 at first thermal interface portion 266.

Airflow 240, which may be first fluid flow 20, may be received into thermal chamber 210 via input channel 222. As airflow 240 travels across evaporative liquid flow 254, evaporative liquid flow 254 may vaporise into the airflow 240. Thermal energy taken from airflow 240 to vaporise evaporative liquid flow 254 cools airflow 240 thereby reducing the thermal energy of airflow 240 to about wet bulb temperature. Cooled airflow 242 may be channeled out of thermal chamber 210 via output channel 224. Meanwhile, evaporative liquid flow 254, which may be second fluid flow 22, may be received into thermal chamber 210 via inlet channel 226. Evaporative liquid flow 254 may be cooled by evaporative cooling and exit thermal chamber 210 via outlet channel 228 as cooled evaporative liquid flow 254. As such, cooled evaporative liquid flow 254 may have a lower thermal energy level than airflow 240 due to evaporative cooling.

Cooled evaporative liquid flow 254 may travel from outlet channel 228 into first channel 272 of heat exchanger 270. At the same time, evaporative liquid 256 from fluid tank 280 may be channeled from fluid tank 280 into second channel 274 as return evaporative liquid flow 258. Thermal energy may be transferred between cooled evaporative liquid flow 254 within first channel 272 and return evaporative liquid flow 258 within second channel 274 thereby cooling return evaporative liquid flow 258 within second channel 274. Return evaporative liquid flow 258 within second channel 274 may be channeled into cooling channel 276 which is fluidly connected to second channel 274 and thermally connected to input channel 222. Return evaporative liquid flow 258 may be channeled towards input channel 222. At first thermal interface portion 266, thermal energy of airflow 240 may be transferred, from airflow 240 to return evaporative liquid flow 258 thereby cooling airflow 240 before airflow 240 enters thermal chamber 210. Cooling channel 276 may extend across input channel 222 such that airflow 240 may flow around fluid channel 260. As airflow 240 flows around fluid channel 260, airflow 240 may be cooled by return evaporative fluid flow 258, which has lower thermal energy level than airflow 240. Cooling channel 276 at the first thermal interface portion 266 may be a plurality of fluid tubes (not shown in FIG. 11) such that first fluid flow 20 may flow between the plurality of fluid tubes.

Fluid handling device 900 may include salt removal mechanism 288. The configuration of fluid tank 280 with heat exchanger 270 provides fluid handling device 900 the salt removal mechanism 288. By using a fluid tank 280, salt content of evaporative fluid 256 may be reduced or minimised before returning evaporative fluid 256 back to the thermal chamber 210. Evaporative liquid flow 254 may contain salt (or impurities). As vaporisation of evaporative liquid flow 254 takes place within thermal chamber 210, the salt concentration in evaporative liquid flow 254 may increase as liquid content of evaporative liquid flow 254 decreases. The salt may accumulate within thermal chamber 210 as evaporative liquid flow 254 increases and eventually may cause disruption to the fluid handling system 900, e.g. clogging of outlet channel 228. By directing cooled evaporative liquid flow 254, which is high in salt concentration, into fluid tank 280, cooled evaporative liquid flow 254 is mixed with evaporative liquid 282 within fluid tank 280. As such, the salt concentration in cooled evaporative liquid flow 254 may be diluted when cooled evaporative liquid flow 254 goes back into fluid tank 280. When evaporative liquid 282 is pumped back into thermal chamber 210 as return evaporative liquid flow 258, the salt concentration of return evaporative liquid flow 258 may be back to "normal" or reduced to a level below the salt concentration of cooled evaporative liquid flow 254.

Although warmer evaporative liquid 256 may be pumped out of fluid tank 280 to be returned to thermal chamber 210, the thermal energy level of returned evaporative liquid flow 258 may be maintained to substantially increase the thermal energy level of cooled evaporative liquid flow 254. The skilled person would understand that heat exchanger 270 disposed between thermal chamber 210 and fluid tank 280 allows return evaporative liquid flow 258 with low salt concentration to be pumped back into thermal chamber 210 but at the thermal energy level of cooled evaporative liquid flow 254. In this way, the thermal efficiency of the fluid handling device 900 may be kept high and yet the issues related of salt accumulation in fluid handling device 900 may be eliminated or minimised.

Figure 11A:
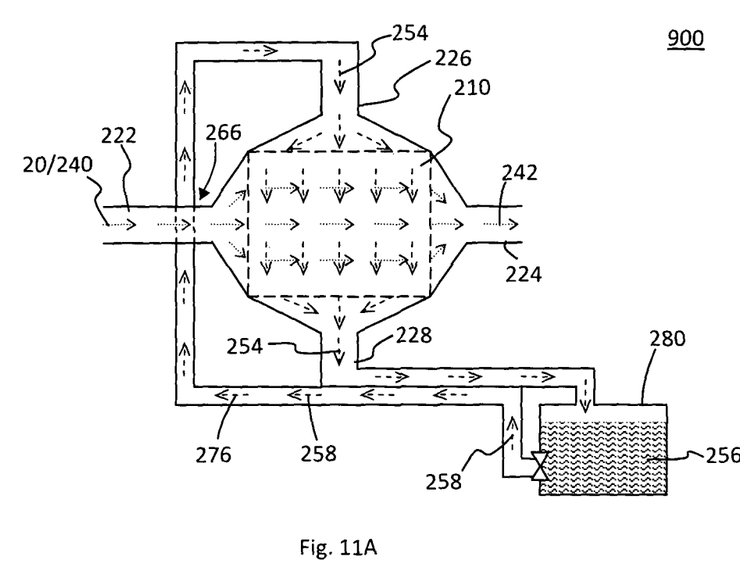
FIG. 11A shows a sectional view of an exemplary embodiment of the handling device in FIG. 8.

Referring to FIG. 11A, outlet channel 228 may be fluidly connected to the fluid tank 280 such that cooled evaporative liquid flow 254 may be channeled from thermal chamber 210 and into fluid tank 280 via the outlet channel 228.

Figure 12:
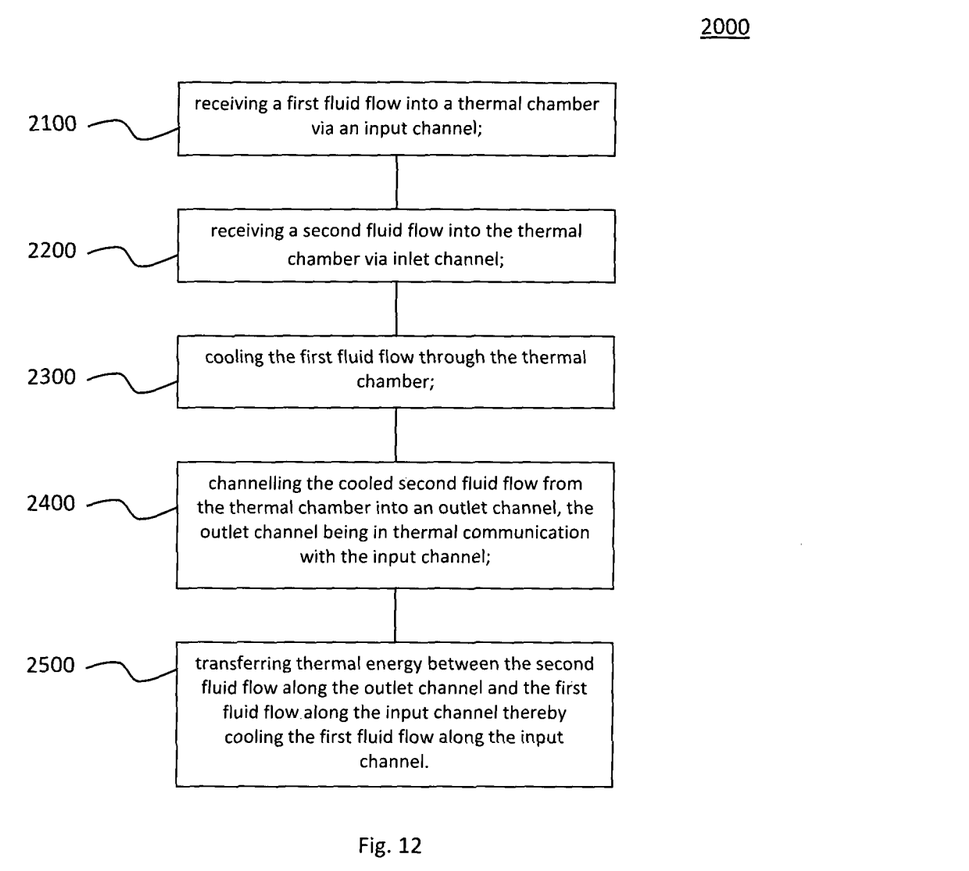
FIG. 12 shows a flowchart of a method of cooling a first fluid flow using the fluid handling device in FIG. 8.

FIG. 12 shows a method 2000 of cooling a first fluid flow with a fluid handling device 800,900. Method 2000 includes receiving a first fluid flow into a thermal chamber 210 via input channel 222 as shown in step 2100. Meanwhile, second fluid flow 22 is received into the thermal chamber 210 via inlet channel 226 as in step 2200. First, fluid flow 20 is cooled through the thermal chamber 210 in step 2300. Second fluid flow 22 is channeled from the thermal chamber 210 into the output channel 224 in step 2400. Outlet channel 228 being in thermal communication with the input channel 222. Second fluid flow 22 along the outlet channel 228 may have a lower thermal energy level than that of the first fluid flow 20 along the input channel 222. Thermal energy is transferred between the second fluid flow 22 along the outlet channel 228 and the first fluid flow 20 along the input channel 222 thereby cooling the first fluid flow 20 along the input channel 222 as shown in step 2500.

First fluid flow 20 may be channeled from the input channel 222 through the thermal chamber 210 towards output channel 224. First fluid flow 20 may be channeled out of thermal chamber 210 via output channel 228. Second fluid flow 22 may be channeled out of the thermal chamber 210 via the outlet channel 228.

Transferring the thermal energy between the second fluid flow 22 along the outlet channel 228 and the first fluid flow 20 along the input channel 222 includes receiving a third fluid flow 24 in a fluid channel 260, transferring thermal energy between the third fluid flow 24 along the fluid channel 260 and the second fluid flow 22 along the outlet channel 228 in step 2740; and transferring thermal energy between the first fluid flow 20 along the input channel 222 and the third fluid flow 24 along the fluid channel 260 thereby heating or cooling the first fluid flow 20 along the input channel 222.

Figure 13:
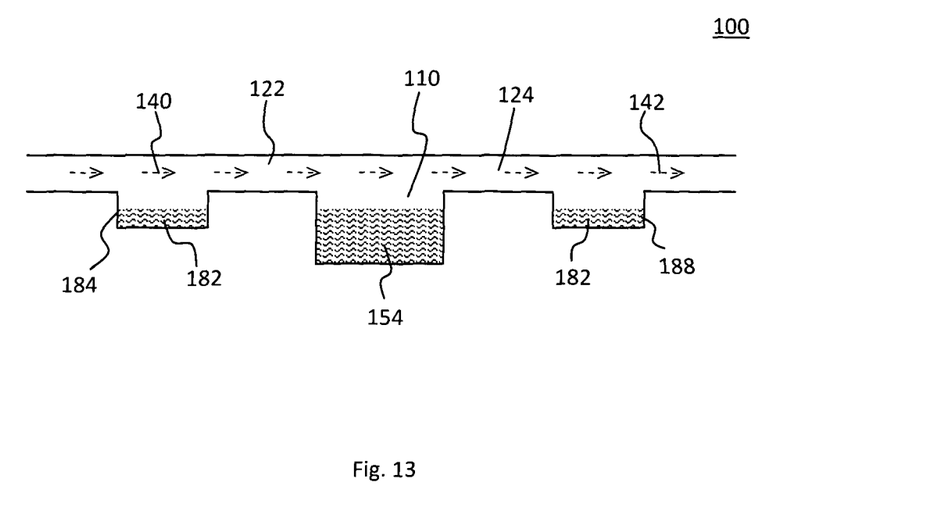
FIG. 13 shows a sectional view of an exemplary embodiment of the fluid handling device in FIG. 1 or FIG. 8.

As shown in FIG. 13, input channel 122 and/or output channel 124 may each include an evaporative liquid 182. Input channel 122 may be fluidly connected to an evaporative compartment 184 such that airflow 140 may flow through evaporative compartment 184 before entering input channel 122. Evaporative compartment 184 may include evaporative liquid 182. As airflow 140 flows through evaporative compartment 184, evaporative cooling occurs as evaporative liquid 182 vaporises. In this way, airflow 140 may be pre-cooled in the evaporative compartment 184 before entering thermal chamber 110. Outlet channel 128 may be fluidly connected to another evaporative compartment 188 such that cooled airflow 142, i.e. airflow 140 after being cooled, may flow through evaporative compartment 188 after exiting thermal chamber 110. Evaporative compartment 188 may include evaporative liquid 182. Cooled airflow 142 along output channel 124 may go through evaporative compartment 188 and thermal energy level of cooled airflow 142 may be maintained. Temperature of cooled airflow 142 may increase as it flows along output channel 124. As temperature increases, relative humidity of cooled airflow 142 decreases. As airflow 140 flows through evaporative compartment 188, evaporative cooling occurs as evaporative liquid 182 vaporises. In this way, temperature of cooled airflow 142 may be maintained after exiting thermal chamber 110. Although the thermal chamber 110 of fluid handling device 100,200,300,500,600 is shown in FIG. 13, it is understood that the configuration of the embodiment, i.e. with evaporative compartment 184 and or 188, may be applicable to the embodiment of fluid handling device 800,900 with thermal chamber 210.

Input channel 122 and/or output channel 124 may be fluidly connected to a cooling compartment each (not shown in FIG. 13). Cooling compartment may include a cooling surface within the cooling compartment. Airflow 140 may go across or through the cooling surface so that airflow 140 may be cooled prior to entering or after leaving the thermal chamber 110. Cooling surface may be surfaces of pipes, e.g. ceramic pipes, that are dipped in an evaporative liquid or plate surface floating on the evaporative liquid. Cooling surface may be a surface of a ceramic tile.

The channels mentioned above, e.g. input channel 122/222, output channel 124/224, inlet channel 126/226, outlet channel 128/228 may be part of thermal chamber 110 such that thermal chamber 110 includes input channel 122 and outlet channel 128. Channels have been used to define a path or portion that fluid flows through. A skilled person would understand that a first portion of thermal chamber 210, e.g. at about the first end 112 of thermal chamber 210, may function as an input channel such that fluid channel 260 may be in thermal communication with the first portion of thermal chamber 210 to enable transfer of thermal energy from the first portion of thermal chamber 210 to the fluid channel 260 and consequently cool the fluid flow along the first portion of thermal chamber 210. Similarly, fluid channel 260 may be fluidly connected directly to thermal chamber 210 at about the second end 114 via an opening such that cooled fluid flow or a portion thereof from thermal chamber 210 may be directed into fluid channel 260. A second portion of thermal chamber 210 at about the second end 114 may be output or outlet channel where cooled fluid flow goes through.

The invention claimed is:

1. A fluid handling device adapted to cool a first fluid flow, the device comprising:
   a thermal chamber adapted to cool the first fluid flow in the thermal chamber; and
   an input channel adapted to channel the first fluid flow into the thermal chamber;
   an output channel adapted to allow the first fluid flow from the input channel to flow out of the thermal chamber via the output channel;
   an inlet channel adapted to allow a second fluid flow into the thermal chamber, the inlet channel being in fluid communication with an outlet channel;
   the outlet channel adapted to channel the second fluid flow out of the thermal chamber;
   wherein the first fluid flow from the input channel to the output channel is an airflow and the second fluid flow from the inlet channel to the outlet channel is an evaporative liquid flow, wherein the airflow through the thermal chamber vaporises the evaporative liquid flow thereby cooling the evaporative liquid flow hence cooling the thermal chamber;

wherein thermal energy of the second fluid flow along the outlet channel is lower than thermal energy of the first fluid flow along the input channel; and wherein the outlet channel is thermally connected to the input channel, wherein the outlet channel is adapted to transfer thermal energy between the cooled second fluid flow along the outlet channel and the first fluid flow along the input channel to cool the first fluid flow before entering the thermal chamber.

2. The fluid handling device of claim 1, wherein the second fluid flow along the outlet channel is isolated from the first fluid flow along the input channel.

3. The fluid handling device of claim 1, wherein the second fluid flow exiting the thermal chamber via the outlet channel is a portion of the first fluid flow along the thermal chamber.

4. The fluid handling device of claim 1, wherein the outlet channel is thermally connected to the input channel via a fluid channel, wherein the fluid channel being in thermal communication with the outlet channel and in thermal communication with the input channel, the fluid channel adapted to receive a third fluid flow therein, wherein thermal energy is transferred between the third fluid flow along the fluid channel and the second fluid flow along the outlet channel thereby heating or cooling the third fluid flow and wherein the thermal energy is transferred between the first fluid flow along the input channel and the third fluid flow along the fluid channel thereby heating or cooling the first fluid flow along the input channel.

5. The fluid handling device of claim 4, wherein the third fluid flow along the fluid channel is isolated from the first fluid flow along the input channel.

6. The fluid handling device of claim 4, wherein the fluid channel comprises an evaporative liquid.

7. The fluid handling device of claim 1, wherein the second fluid flow along the outlet channel is a same fluid flow as the first fluid flow along the input channel, wherein the first fluid flow from the input channel is channeled out of the thermal chamber via the outlet channel as the second fluid flow.

8. The fluid handling device of claim 1, wherein the thermal chamber comprises an evaporative liquid.

9. The fluid handling device of claim 1, wherein the evaporative liquid flow is adapted to flow through the thermal chamber from the inlet channel to the outlet channel in a fluid direction, the airflow flows from the input channel to the output channel in an airflow direction, wherein the fluid direction is substantially perpendicular to the airflow direction.

10. The fluid handling device of claim 1, wherein the outlet channel is fluidly connected to a fluid tank.

11. A method of cooling a first fluid flow with a fluid handling device, the method comprising:

receiving the first fluid flow into a thermal chamber via an input channel;

channeling the first fluid flow out of the thermal chamber via an output channel;

receiving a second fluid flow into the thermal chamber via an inlet channel;

channeling the second fluid flow from the thermal chamber into an outlet channel, the outlet channel being in thermal communication with the input channel, wherein the first fluid flow from the input channel to the output channel is an airflow and the second fluid flow from the inlet channel to the outlet channel is an evaporative liquid flow, wherein the airflow through the thermal chamber vaporises the evaporative liquid flow thereby cooling the evaporative liquid flow hence cooling the thermal chamber, wherein the second fluid flow along the outlet channel has a lower thermal energy than the first fluid flow along the input channel; and transferring thermal energy between the second fluid flow along the outlet channel and the first fluid flow along the input channel thereby cooling the first fluid flow along the input channel.

12. The method of claim 11, wherein transferring the thermal energy between the second fluid flow along the outlet channel and the first fluid flow along the input channel includes:

receiving a third fluid flow in a fluid channel;

transferring the thermal energy between the third fluid flow along the fluid channel and the second fluid flow along the outlet channel; and transferring thermal energy between the first fluid flow along the input channel and the third fluid flow along the fluid channel thereby heating or cooling the first fluid flow along the input channel.

* * * * *